United States Patent
Hansen et al.

(10) Patent No.: US 7,349,345 B1
(45) Date of Patent: Mar. 25, 2008

(54) METHOD AND APPARATUS FOR TESTING COMMUNICATIONS BETWEEN A NETWORK EDGE DEVICE AND A CUSTOMER PREMISES DEVICE

(75) Inventors: Kevin Hansen, Shawnee, KS (US); Walt Weber, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 875 days.

(21) Appl. No.: 10/160,631

(22) Filed: May 31, 2002

(51) Int. Cl.
*G01R 31/08* (2006.01)

(52) U.S. Cl. ............... 370/242; 370/352; 370/216

(58) Field of Classification Search ......... 370/216, 370/221, 224, 241.1, 242, 247–249, 252, 370/352; 379/1.01, 1.03–1.04, 21–22, 22.01, 379/22.04, 27.01, 26.01
See application file for complete search history.

(56) References Cited

U.S. PATENT DOCUMENTS

| | | | | |
|---|---|---|---|---|
| 6,185,191 | B1 * | 2/2001 | Dipperstein | 370/249 |
| 6,272,553 | B2 | 8/2001 | Way et al. | 709/250 |
| 6,654,914 | B1 * | 11/2003 | Kaffine et al. | 714/43 |
| 6,768,794 | B1 * | 7/2004 | Morgenstern | 379/325 |
| 6,826,259 | B2 * | 11/2004 | Hoffman | 379/10.03 |
| 2001/0043673 | A1 * | 11/2001 | Gershon | 379/22.02 |
| 2002/0057763 | A1 * | 5/2002 | Sisk et al. | 379/1.04 |
| 2002/0191546 | A1 * | 12/2002 | Chong | 370/252 |
| 2003/0036920 | A1 * | 2/2003 | Smith et al. | 705/1 |
| 2003/0039335 | A1 * | 2/2003 | Pharoah et al. | 379/22 |
| 2003/0048756 | A1 * | 3/2003 | Chang et al. | 370/252 |
| 2003/0223375 | A1 * | 12/2003 | Govreen-Segal | 370/248 |
| 2003/0228000 | A1 * | 12/2003 | Horn | 379/29.01 |
| 2005/0025288 | A1 * | 2/2005 | Sachs | 379/22.03 |

* cited by examiner

*Primary Examiner*—Firmin Backer
*Assistant Examiner*—Nguyen Ngo

(57) ABSTRACT

A method and apparatus for testing communications within a broadband network between a network edge device and a customer premises device. Network data traffic is diverted from the customer premises device to a test device. The test device emulates the customer premises device through the use of identifying data associated with the customer premises device. In one embodiment, data is diverted from the customer premises device to a test port loop back converter, which performs a DSL conversion of the data. The converted data is backhauled from the test port loop back converter to a test network edge device. The data is then sent from the test network edge device to a test customer premises device. The test customer premises device can be located at a site remote from the network edge device or can be collocated with and directly coupled to the network edge device.

16 Claims, 4 Drawing Sheets

METHOD AND APPARATUS FOR TESTING COMMUNICATIONS BETWEEN A NETWORK EDGE DEVICE AND A CUSTOMER PREMISES DEVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention, referred to herein as the Line Test System, relates to the testing of communications within a broadband network, and more specifically it relates to a method and apparatus for testing communications between a network edge device and a customer premises device.

BACKGROUND OF THE INVENTION

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexers. Each local loop carries ATM over ADSL (asymmetric digital subscriber line) traffic to an integrated service hub (ISH), which may be at either a residential or a business location.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports (also referred to as jacks) for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

Each ISH is provided with an identification code known as a Media Access Control (MAC) ID that uniquely identifies a particular ISH. The MAC ID is a hardware identifier associated with the Network Interface Card (NIC) in each ISH. An ISH identifies itself to a configuration server by sending its MAC ID to the server. The server contains a database of configurations for all ISHs, including global and customer specific configuration parameters. Thus, each ISH can have its own unique configuration based on its MAC ID.

In providing telephony services over a broadband network, the ISH typically relays a signal between a user's telephone and a series of intermediate devices leading to the network. As used herein "telephone" generally refers to a device, a portion of which is typically handheld, for converting sound to electrical signals and vice-versa and further comprising a ringer that rings in response to a ring current, provided however that telephone should also be understood to include any device that responds to telephony signals such as a facsimile machine, modem, or computer. Telephones typically use the analog telephony format. Digital format telephones could also be used, with the understanding that the specific support circuitry in the ISH would change while providing equivalent functions (for example, detecting hook transitions).

A typical series of devices through which a signal might pass between a broadband network and a telephone is shown in FIG. 1. An incoming signal from a network 1 or the Internet 2 to a telephone 18 first passes through a service node 4, then through front end routers 6, an ATM switch 8, an ATM multiplexer (AMUX) 10, and a network edge device 12 such as a digital subscriber line access multiplexer (DSLAM). The signal then passes through connection 15, which is typically a metallic line (e.g., a twisted copper pair of wires) controlled by a local telephone company, also known as a Local Exchange Carrier or LEC, into a customer premises device 16 such as an ISH. The ISH 16 then sends the signal to the telephone 18.

A provider of broadband telephony services typically has control of all equipment and connections from the network 1 up to and including the DSLAM 12. Network monitoring devices installed in the network 1 and DSLAM 12 provide physical path verification of the connections to discover, diagnose, and locate problems occurring between the network 1 and DSLAM 12. If a loss of signal or other physical layer transmission error occurred between those two points, the service provider would be able to remotely pinpoint the location and nature of the problem. However, the monitoring devices cannot provide service layer visibility over the entire path from the network 1 to the telephone 18. The equipment and connections from LEC line 15 to the telephone 18 are not controlled by the service provider and therefore cannot always be monitored remotely. With existing technology, the provider typically cannot determine remotely whether a problem in the path from the LEC line 15 to the telephone 18 is located in the LEC line 15, the ISH 16, or the customer's telephone 18. A repair technician would have to be dispatched to locate such a problem. Dispatching a technician is expensive and can turn out to be unnecessary if the problem is discovered to be within the LEC line 15 or the customer's telephone 18 or is attributed to user error.

SUMMARY OF THE INVENTION

The present invention discloses a method and apparatus for testing communications within a broadband network between a network edge device and a customer premises device. Network data traffic is diverted from a device at a customer's premises to a similar test device. The test device emulates the customer premises device through the use of identifying data associated with the customer premises device. In an embodiment of the invention, network data traffic is diverted from the customer premises device to a test port loop back converter coupled to the network edge device. The test port loop back converter performs a DSL conversion of the data and the converted data is then backhauled from the test port loop back converter to a test network edge device coupled to the test port loop back converter. The data is then sent from the test network edge device to a test customer premises device coupled to the test network edge device. The test customer premises device is located at a site remote from the network edge device. In another embodiment, the test customer premises device is collocated with and directly coupled to the network edge device. In this case, DSL conversion and backhauling of data is not necessary. The network edge device may be a digital subscriber line access multiplexer (DSLAM) and the customer premises device may be an integrated services hub (ISH). The connection between the DSLAM and the ISH may be an xDSL connection. The broadband network may be an ATM network. The identifying data associated with the customer premises device can be automatically entered into the test customer premises device when network data traffic is diverted from the customer premises device to the test customer premises device.

DETAILED DESCRIPTION OF THE PREFERRED EMBODIMENTS

Figure 1:
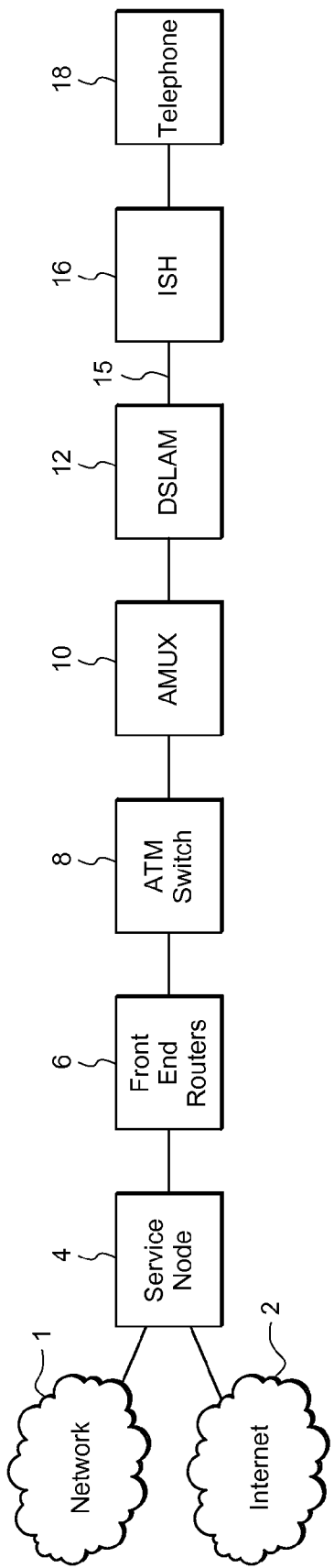
FIG. 1 is a block diagram showing a series of devices through which a broadband telephony signal might pass.
Figure 2:
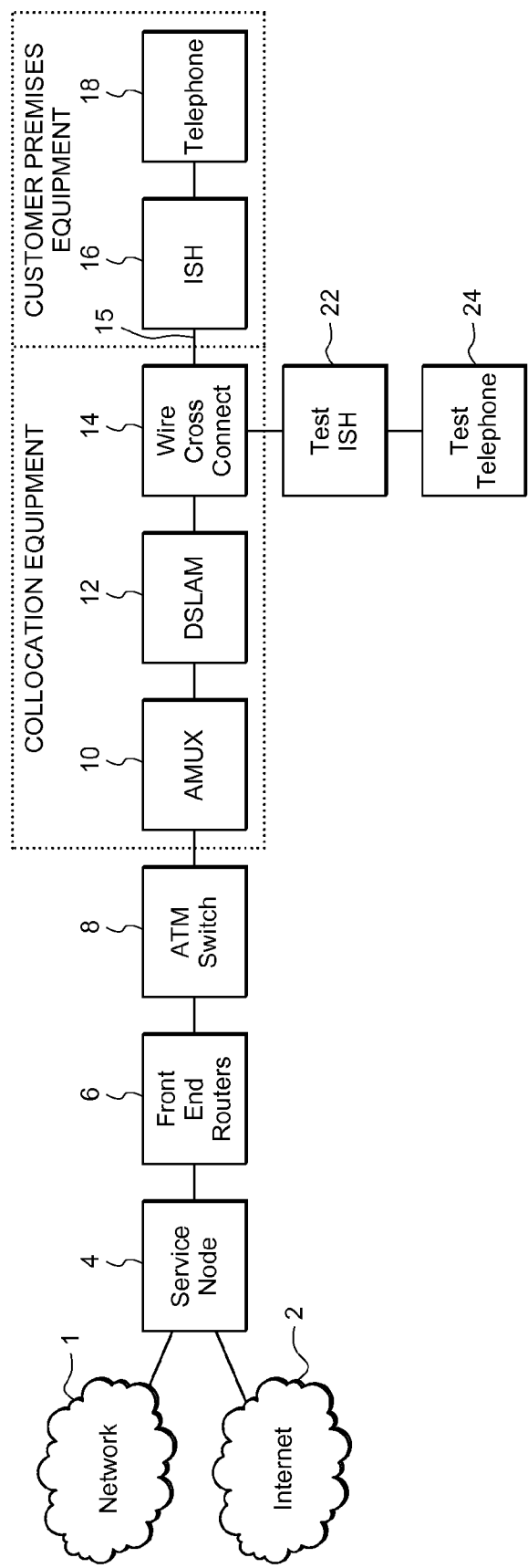
FIG. 2 is a block diagram showing the general principles of the Line Test System.

The Line Test System allows a broadband telephony service provider to monitor the equipment and connections between a network edge device and a device located at a customer's premises. The general operating principles of the Line Test System are shown in FIG. 2. A customer premises device 16 and a customer's telephone 18 are located within the customer's premises. An AMUX 10 and a network edge device 12 are typically collocated near the customer's premises. In the embodiment of FIG. 2, the network edge device 12 is a DSLAM and the customer premises device 16 is an ISH. The telephone signal is diverted from the customer ISH 16 to a test customer premises device 22 by means of wire cross connect device 14. The wire cross connect device 14 is shown external to the DSLAM 12 in FIG. 2 but could also be configured internally to the DSLAM 12. The wire cross connect device 14 switches communications from the customer ISH 16 to the test customer premises device 22 upon receipt of an appropriate command from a technician. In an embodiment of the invention, the test customer premises device 22 is an ISH. The test ISH 22 in FIG. 2 can be collocated with the AMUX 10 and the DSLAM 12 or can be located at a remote operations center. The test telephone 24 is located at a remote operations center.

The MAC ID for the ISH 16 of the customer reporting a problem can be entered into the test ISH 22. The test ISH 22 sends the MAC ID to the configuration server which then sends the customer's configuration parameters back to the test ISH 22. The test ISH 22 is then able to take on all of the characteristics of the customer ISH 16 and act as a substitute for the customer ISH 16. When the network traffic that would normally travel between the network 1 and the customer telephone 18 is instead diverted through the test ISH 22, the test ISH 22 can emulate the customer ISH 16. Test technicians at the remote operations center can then attempt to reproduce the service problem reported by the customer and can determine if the problem is in the path that includes the LEC line 15, the customer ISH 16, and the customer's telephone 18, or if the problem is elsewhere in the path from the network 1 to the telephone 18. If the test ISH 22 exhibits the same problem as the customer ISH 16, then it can be concluded that the problem is not in the LEC line 15, the customer ISH 16, or the telephone 18. If the test ISH 22 does not exhibit the same problem as the customer ISH 16, the problem must be in the LEC line 15, the customer ISH 16, or the customer telephone 18. In this case, additional tests can be performed with the customer via a phone call to further isolate the cause of a problem. This remote testing can eliminate the need to dispatch a technician to locate the problem.

Figure 3:
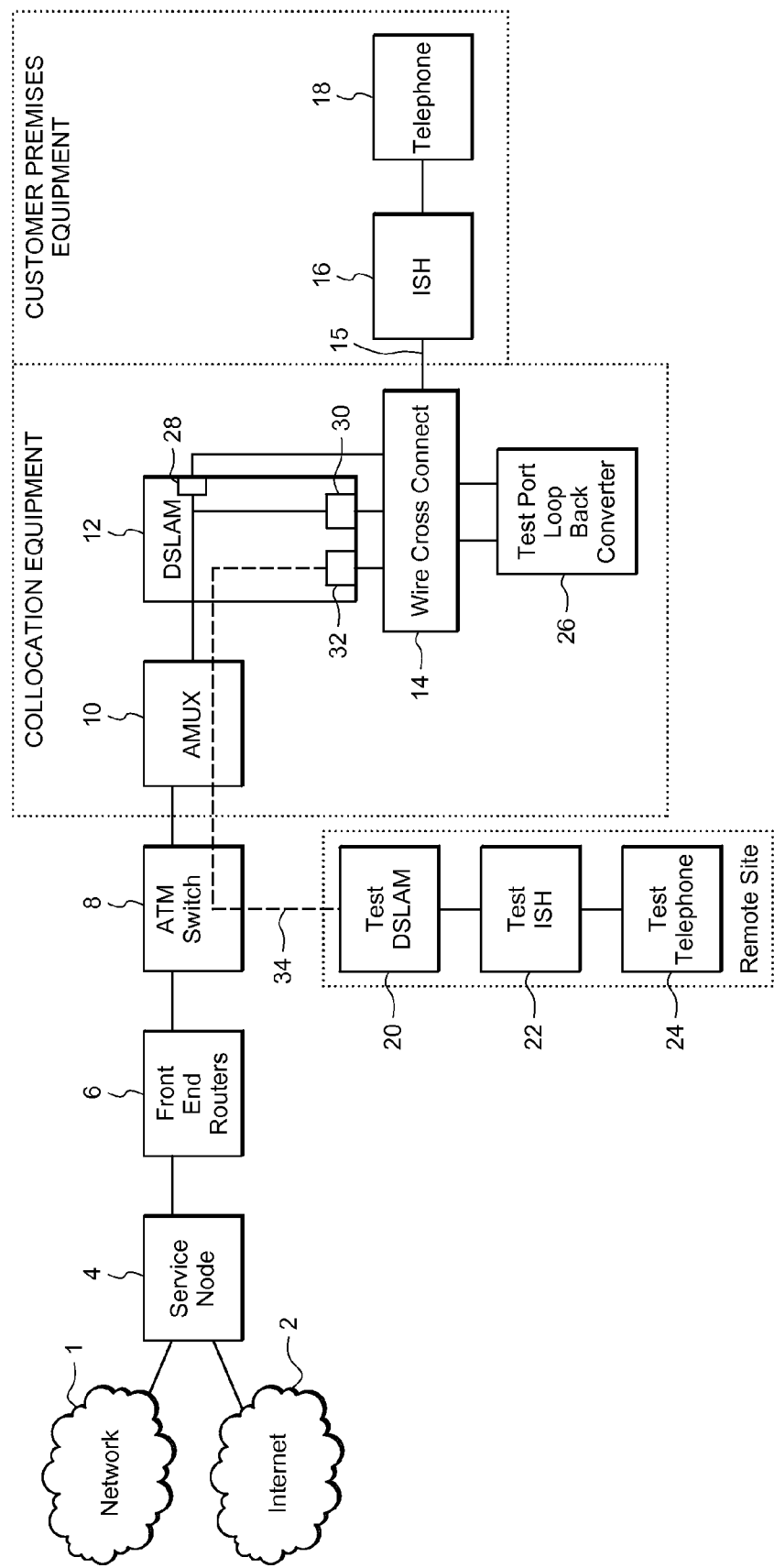
FIG. 3 is a block diagram showing an embodiment of the Line Test System.

An embodiment of the Line Test System is depicted in FIG. 3. In this embodiment, a test port loop back converter 26 is collocated with the AMUX 10 and the DSLAM 12. A DSLAM 12 typically has multiple ports 28 into which multiple customer ISHs 16 can connect. For the sake of clarity in the drawing, only one port 28 is shown in FIG. 3. In this embodiment, the DSLAM 12 also has two test ports 30 and 32. Test technicians at the remote operations center can send a command to the wire cross connect device 14 that switches the telephone signal from a port 28 with a regular ISH connection to test port 30. Traffic then flows from test port 30 to test port loop back converter 26, which performs a DSL conversion on the data. DSL technology uses an office port and a complementary subscriber port. An office port must be connected to a subscriber port. A subscriber port cannot be connected to a subscriber port and an office port cannot be connected to an office port. The DSLAM 12 contains only office ports. The test port loop back converter 26 is used to connect one DSLAM office port to another. It contains two subscriber ports and transfers the payload data from one of its subscriber ports to the other. This allows a payload data transmission path from DSLAM test port 30, through the test port loop back converter 26, back to DSLAM test port 32. Data is then backhauled over path 34 from test port 32 through DSLAM 12, AMUX 10, and ATM switch 8 to a test DSLAM 20 and then to a test ISH 22 and a test telephone 24. Test technicians at the remote operations center can then emulate the connection between the DSLAM 12 and the customer's telephone 18 as described above. In this embodiment, the test DSLAM 20, the test ISH 22, and the test telephone 24 are located at the remote operations center.

Figure 4:
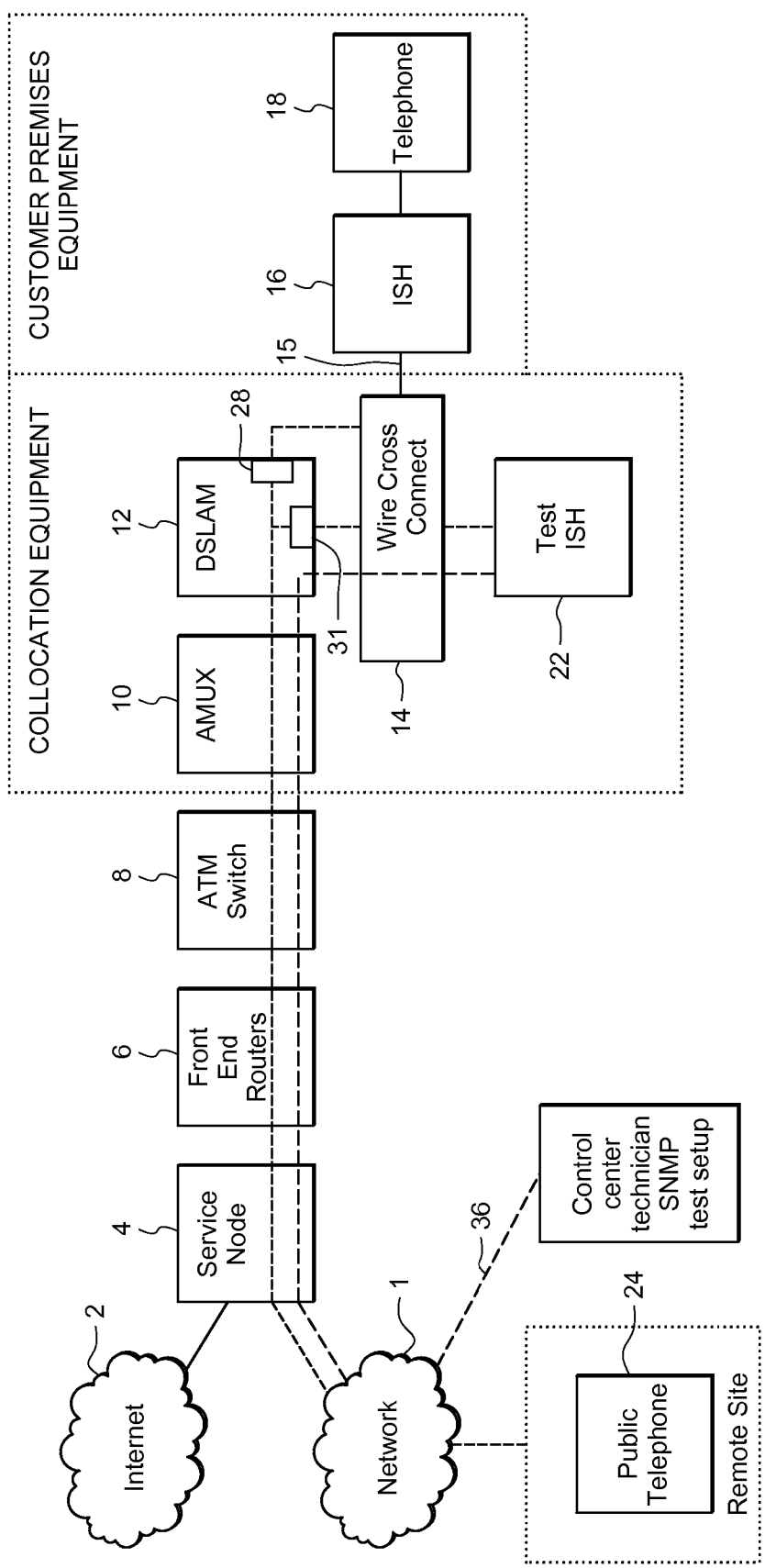
FIG. 4 is a block diagram showing another embodiment of the Line Test System.

An alternative embodiment is shown in FIG. 4. In this embodiment, the test ISH 22 is collocated with the AMUX 10 and the DSLAM 12. When the test ISH 22, the AMUX 10, and the DSLAM 12 are collocated in this manner, no DSL conversion of the telephone signal is necessary. The DSLAM 12 again has multiple normal ports 28 and a test port 31. As in the previously described embodiment, test technicians at the remote operations center can send a command to the wire cross connect device 14 that switches the telephone signal from a port 28 to test port 31. Traffic then flows from test port 31 to the collocated test ISH 22. Test technicians at the remote operations center can then instruct the test ISH 22, via in-band SNMP commands on path 36, to perform test simulations such as originating a phone call, terminating a phone call, and/or applying a confirmation tone. These tests can be used to identify service problems but the test available in the embodiment depicted in FIG. 4 are not as extensive as those available in the embodiment depicted in FIG. 3. Feature verification tests such as call waiting and calling number delivery cannot be performed but enough testing capability is provided to isolate the majority of customer issues.

In an embodiment, the connection 15 in FIGS. 1 through 4 is an xDSL connection carried by a physical land line, typically a twisted copper pair. xDSL is a generic term encompassing all varieties of digital subscriber lines (DSL) such as ADSL, U-ADSL, SDSL, HDSL2, RADSL, etc.

In another embodiment, the MAC ID of the customer's ISH is stored within the ISH and is transferred from the customer's ISH to the test ISH when the telephone signal is diverted from the customer's ISH to the test ISH. The MAC ID is then automatically entered into test ISH to allow the test ISH to emulate the customer's ISH.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for testing communications within a broadband network between a network edge device and a customer premises device comprising:
   diverting network data traffic between a network edge device and a customer premises device to a test customer premises device;
   emulating the customer premises device with the test customer premises device through entry into the test customer premises device of identifying data associated with the customer premises device;
   diverting network data traffic from the customer premises device to a test port loop back converter coupled to the network edge device;
   performing a DSL conversion on the network data by the test port loop back converter;
   backhauling the converted data from the test port loop back converter to a test network edge device coupled to the test port loop back converter; and
   sending the converted data from the test network edge device to a test customer premises device coupled to the test network edge device.

2. The method of claim 1 wherein the identifying data associated with the customer premises device is a MAC ID.

3. The method of claim 1 wherein the network edge device is a DSLAM.

4. The method of claim 1 wherein the customer premises device is an ISH.

5. The method of claim 1 wherein the broadband network is an ATM network.

6. The method of claim 1 wherein the connection between the network edge device and the customer premises device is an xDSL connection.

7. The method of claim 1 further comprising automatically entering the identifying data associated with the customer premises device into the test customer premises device when network data traffic is diverted from the customer premises device to the test customer premises device.

8. The method of claim 1 further comprising diverting network data traffic from the customer premises device to the test port loop back converter by means of a remote switch.

9. An apparatus for testing communications within a broadband network between a network edge device and a customer premises device comprising:
   a test customer premises device coupled to a network edge device and configured to receive network data traffic diverted from a customer premises device and to emulate the customer premises device through the use of identifying data associated with the customer premises device;
   a test port loop back converter coupled to the network edge device and configured to receive network data traffic diverted from the customer premises device and perform a DSL conversion on the network data;
   a test network edge device coupled to the test port loop back converter and configured to receive converted data backhauled from the test port loop back converter; and
   a test customer premises device coupled to the test network edge device.

10. The apparatus of claim 9 wherein the identifying data associated with the customer premises device is a MAC ID.

11. The apparatus of claim 9 wherein the network edge device is a DSLAM.

12. The apparatus of claim 9 wherein the customer premises device is an ISH.

13. The apparatus of claim 9 wherein the broadband network is an ATM network.

14. The apparatus of claim 9 wherein the connection between the network edge device and the customer premises device is an xDSL connection.

15. The apparatus of claim 9 wherein the identifying data is automatically entered into the test customer premises device when network data traffic is diverted from the customer premises device to the test customer premises device.

16. The apparatus of claim 9 further comprising a remote switch to divert network data traffic from the customer premises device to the test port loop back converter.

* * * * *